United States Patent Office 2,746,988
Patented May 22, 1956

2,746,988

ISOCYANATE-BISULFITE ADDUCT-FORMALDE-
HYDE REACTION AND PRODUCT

Arnold Doser, Koln-Mulheim, Germany, assignor to Farbenfabriken Bayer Aktiengesellschaft, Leverkusen, Germany, a corporation of Germany No Drawing. Application February 21, 1951,
Serial No. 212,191

Claims priority, application Germany February 21, 1950

6 Claims. (Cl. 260—513)

It is known to react isocyanates with bisulfites. Addition products result, which in contrast to the isocyanates themselves are suitable for reactions in aqueous solution (cf. Ann. 562, page 216 et seq.). In isocyanates of higher molecular weight, which contain more than ten carbon atoms, the slight solubility of these addition products in water is disadvantageous.

It is an object of this invention to produce compounds capable of yielding isocyanates at raised temperature which do not readily react with water even in alkaline solution.

A further object is the provision of compounds of this class which are easily water soluble.

Another object resides in the production of novel hydrophobic agents i. e. compounds capable of rendering textiles water repellent.

A still further object is the creation of a new process of impregnating textiles or other fibrous material in order to render them water repellent.

Still further objects will become apparent as the following specification proceeds.

I have found that novel reaction products suitable for a large number of applications are obtained by reacting the addition products obtained from mono- or polyisocyanates and alkali metal bisulfites with formaldehyde.

As starting materials a number of addition products from isocyanates of all kinds and alkali metal bisulfite may be named such as for instance bisulfite addition products of hexylisocyanate, dodecylisocyanate, octadecylisocyanate or of isocyanates obtained from palm-nut-oil fatty acids, hydrogenated train-oil fatty acids or from the fatty acids obtained by oxidation of paraffins by conversion into the corresponding amines and reaction with phosgene, and also isocyanates which contain hetero atoms or groups of hetero atoms in the alkyl radical, diisocyanates such as tetramethylene-, hexamethylene-diisocyanate, aromatic isocyanates such as phenyl isocyanate and toluylenediisocyanate.

The reaction of the bisulfite addition products of these isocyanates with formaldehyde is preferably carried out by adding to the aqueous solution of the addition product an aqueous solution of formaldehyde in a molar ratio of 1:1 or if desired with an excess of formaldehyde. It is also possible to mix the solid bisulfite addition products with polymeric formaldehyde and to dissolve these mixtures in water which contains some sodium carbonate. If necessary, heat is used to effect solution. By the treatment with formaldehyde the bisulfite addition products of isocyanates become more easily soluble in water and more insensitive to water. The products obtained by reaction of formaldehyde with the addition products of alkali metal bisulfite and isocyanates may be employed as compounds which yield the isocyanate on heating. It has further been found that products containing higher aliphatic radicals are particularly suitable for making textiles water repellent.

This is accomplished by impregnating the textiles with alkaline or neutral aqueous solutions or emulsions of the reaction products, squeezing or centrifuging and finally heating the textiles treated to a temperature of about 100–120° C. After centrifuging and before the heat-treatment is carried out the product may be dried. In the final heat-treatment heating for a few minutes is generally sufficient. The products may also be employed in weakly acid medium, for instance in dilute acetic acid. Furthermore they may be employed together with paraffin-wax-emulsions. It is possible in this manner to render textiles water repellent which effect is resistant against washing and dry cleaning. The process is carried out in a very simple manner at a comparatively low temperature and in a comparatively short time.

Example 1

30 parts of the sodium bisulfite addition product of octadecyl-isocyanate are mixed with 100 parts of water and 300 parts of hot water poured over the paste. The mixture is heated to 80° C. whereupon dissolution occurs. 15 parts of formaldehyde (30%) are added at 80–85° C. On cooling the foaming solution the reaction product crystallizes. It may be sucked off and dried at a low temperature. If eight parts of soda solution of 10% strength are added to this hot solution the foam breaks immediately and a milky solution is obtained which after cooling is stable even after a day.

Cotton poplin fabric is impregnated on the foulard with this emulsion heated to 60° C. and dried on a drum or on a calender at a temperature of 100–120° C. The poplin fabric is thus rendered water repellent. Good effects are also obtained without the addition of soda or after acidifying the emulsion with some acetic acid.

Example 2

30 parts of the sodium bisulfite addition product of octadecyl isocyanate employed in Example 1 are pulverized together with 2.4 parts of paraformaldehyde. The mixture is pasted with 300 parts of hot water. After heating for ten minutes to 85° C. eight parts of a soda solution of 10% strength are added. A clear solution is obtained which soon turns into a milky, very fine emulsion, which remains unchanged when cooled to 25° C.

Example 3

30 parts of the sodiumbisulfite addition product of octadecylisocyanate are finely ground with 2.4 parts of paraformaldehyde and 1.6 parts of soda. The mixture is pasted with 80 parts of cold water whereupon 800 parts of hot water are poured in. At 70° C. a colloidal solution is obtained which becomes turbid by cooling to 25° C. and shows a certain tendency to crystallize. If instead of 1.6 parts of soda eight parts of soda are used in the production of the mixture a colloidal solution is obtained at 75° C. which yields a milky emulsion remaining unchanged for a considerable time at 25° C.

Example 4

15 parts of the addition product of sodium bisulfite and phenylisocyanate are dissolved in 150 parts of water and 20 parts of aqueous formaldehyde are added. The solution has become more stable against heating than the isocyanate bisulfite solution unreacted with formaldehyde. On boiling a colloidal solution is obtained from which a resin separates. Without formaldehyde the solution of the addition product of sodium bisulfite and phenylisocyanate yields diphenylurea quickly and quantitatively on heating.

Example 5

Five parts of 30% aqueous formaldehyde are added to a concentrated aqueous solution of ten parts of the addition product of sodium bisulfite and hexamethylene diisocyanate. On boiling the solution remains clear even if it has been made weakly alkaline with soda. On the other hand the emulsion of the bisulfite-diisocyanate-addition-compound quickly decomposes on boiling, especially in the presence of soda.

*Example 6*

A cotton poplin rain coat is impregnated with an emulsion obtained by heating 40 parts of the addition product of sodium bisulfite and palm-nut-oil-isocyanate with ten parts of paraformaldehyde in 2000 parts of water at 90° C. and one part of soda added. The coat is wrung out, dried in the air and thereafter ironed. It is then water-resistant and retains this property even after washing and dry cleaning with the solvents ordinarily used for this purpose, for instance gasoline, carbontetrachloride, trichloroethylene, or benzene.

*Example 7*

30 grams of an emulsion containing 40% of paraffin-wax and 7.5% of sodium oleate are filled up with water to 400 cc. at 40° C. while stirring. A second emulsion is added which has been prepared from 20 grams of the addition product of sodiumbisulfite and octadecylisocyanate dissolved in 600 cc. of water at 90° C. and reacted with 12 cc. of a 30% aqueous formaldehyde solution and 5 cc. of sodium carbonate solution of 10% strength.

Textile materials of any sort or description may be impregnated with this emulsion. The impregnation can be carried out at room temperature or raised temperature. The textiles are dried, finally at temperatures of at least 110° C. The textiles have become water repellent by this treatment, the water repellency being stable against dry cleaning and washing. Instead of the sodium-oleate employed as an emulsifier for the paraffin-wax-emulsion, an addition product of formaldehyde-bisulfite and octadecyldipropylenetriamine may be employed.

I claim:

1. A process which comprises mixing the solid addition product of sodium bisulfite and octadecylisocyanate with about an equimolecular proportion of formaldehyde in the form of paraformaldehyde, heating the mixture in water to a temperature of about 80–90° C., adding to the liquid medium a small amount of sodium carbonate and allowing the mixture to cool to room temperature.

2. The product obtained by reacting formaldehyde with the solid addition product of sodium bisulfite and octadecylisocyanate in the presence of water at an elevated temperature at least about 70° C.

3. A composition of matter comprising a smaller portion of sodium carbonate and a larger portion of the product obtained by reacting formaldehyde with the solid addition product of sodium bisulfite and octadecylisocyanate in the presence of water at an elevated temperature at least about 70° C.

4. A process which comprises reacting in an aqueous medium the addition product of an alkali metal bisulfite and an isocyanate selected from the group consisting of aliphatic and aromatic isocyanates with at least the equimolecular portion of formaldehyde at an elevated temperature at least about 70° C.

5. A process for reacting formaldehyde with the addition product of sodium bisulfite and octadecylisocyanate which comprises adding said addition product in water with at least an equimolecular portion of said formaldehyde in water and allowing the reaction to proceed at an elevated temperature at least about 70° C. until the reaction product is formed.

6. The product obtained by reacting formaldehyde with the solid addition product of an alkali metal bisulfite and an organic isocyanate selected from the group consisting of aliphatic and aromatic isocyanates in the presence of water at an elevated temperature at least about 70° C.

References Cited in the file of this patent

UNITED STATES PATENTS

| | | |
|---|---|---|
| 2,343,920 | Maxwell | Mar. 14, 1944 |

FOREIGN PATENTS

| | | |
|---|---|---|
| 565,780 | Great Britain | Nov. 28, 1944 |

OTHER REFERENCES

Chemical Abstracts, 1950, vol. 44, columns 115–117. Citing Ann. 562, 205–29 (1949).

Bayer: Angewandte Chemicie, vol. 59, No. 9, Sept. 1947, pages 265 and 266.